United States Patent
Haasz et al.

(10) Patent No.: US 8,376,680 B2
(45) Date of Patent: Feb. 19, 2013

(54) ASSEMBLY

(75) Inventors: Andras D Haasz, Bristol (GB); Christopher J Burden, Chepstow (GB); Jonathan Wilson, Ashbuy-de-la-Zouch (GB); Alexander E H Fitzhugh, Bristol (GB); Samuel M Sampson, Bristol (GB)

(73) Assignee: Rolls-Royce PLC, London (GB)

( * ) Notice: Subject to any disclaimer, the term of this patent is extended or adjusted under 35 U.S.C. 154(b) by 321 days.

(21) Appl. No.: 12/692,259

(22) Filed: Jan. 22, 2010

(65) Prior Publication Data
US 2010/0202855 A1  Aug. 12, 2010

(30) Foreign Application Priority Data

Feb. 10, 2009 (GB) .................... 0902078.5

(51) Int. Cl.
F16B 21/14  (2006.01)
B23P 11/02  (2006.01)

(52) U.S. Cl. ......... 411/514; 411/82.5; 411/909; 403/28; 29/447

(58) Field of Classification Search ............ 411/513, 411/514, 315, 316, 909, 82.5; 403/28, 30; 29/447
See application file for complete search history.

(56) References Cited

U.S. PATENT DOCUMENTS

| | | | | |
|---|---|---|---|---|
| 357,813 A | * | 2/1887 | Brown | 411/513 |
| 1,308,018 A | * | 6/1919 | Wilson | 411/514 |
| 1,768,720 A | * | 7/1930 | Taylor | 411/515 |
| 2,391,140 A | * | 12/1945 | Dilley | 411/513 |
| 4,462,651 A | * | 7/1984 | McGaffigan | 439/161 |
| 4,485,816 A | * | 12/1984 | Krumme | 606/219 |
| 4,841,100 A | * | 6/1989 | Ignasiak | 174/138 G |
| 5,120,175 A | * | 6/1992 | Arbegast et al. | 411/501 |
| 5,791,899 A | | 8/1998 | Sachdeva et al. | |
| 6,946,040 B2 | * | 9/2005 | Homma | 148/563 |
| 7,600,301 B2 | * | 10/2009 | Rudduck et al. | 24/606 |
| 7,628,874 B2 | * | 12/2009 | Wojcik | 148/675 |
| 7,836,564 B2 | * | 11/2010 | Barvosa-Carter et al. | 24/442 |
| 8,225,478 B2 | * | 7/2012 | Kane | 29/447 |

FOREIGN PATENT DOCUMENTS

| | | |
|---|---|---|
| DE | 101 08 956 A1 | 9/2002 |
| JP | A-3-11771 | 5/1991 |
| JP | A-6-10926 | 1/1994 |
| JP | A-2003-301815 | 10/2003 |
| JP | A-2004-44653 | 2/2004 |
| RU | 2 019 732 C1 | 9/1994 |

OTHER PUBLICATIONS

British Search Report issued in British Patent Application No. GB0902078.5, on Apr. 23, 2009.

* cited by examiner

*Primary Examiner* — Victor Batson
*Assistant Examiner* — Tyler Johnson
(74) *Attorney, Agent, or Firm* — Oliff & Berridge, PLC

(57) ABSTRACT

An assembly comprises first and second components provided with holes receiving a retaining element in the form of a pin, in order to retain the components together. The pin is made from a shape memory effect material, and is inserted into the holes in a straight configuration, following which a change in temperature causes a retaining portion of the pin to deform into a second configuration, in which withdrawal of the pin is prevented.

14 Claims, 3 Drawing Sheets

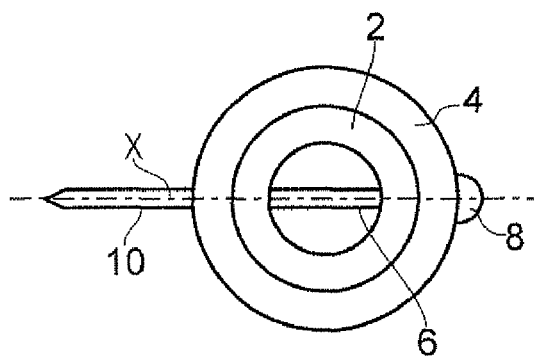 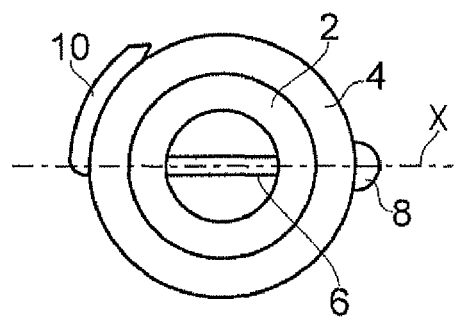
FIG. 1   FIG. 2
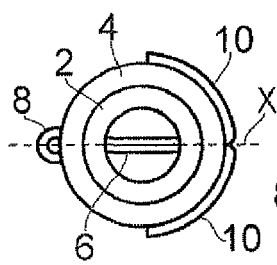 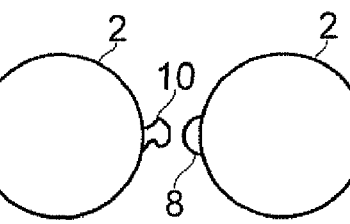 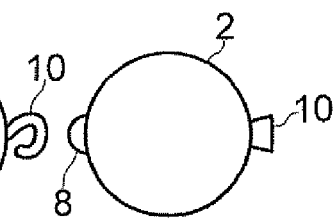 
FIG. 3   FIG. 4   FIG. 5   FIG. 6
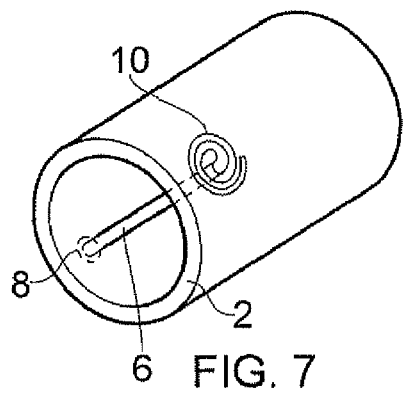
FIG. 7

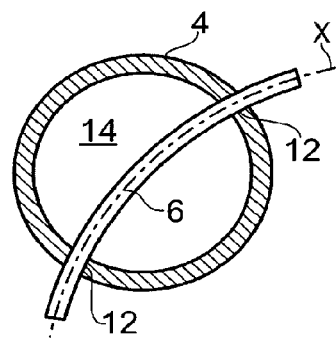
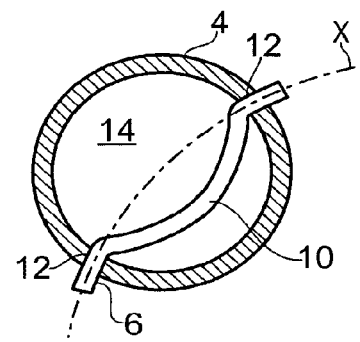
FIG. 8　　　　　　FIG. 9
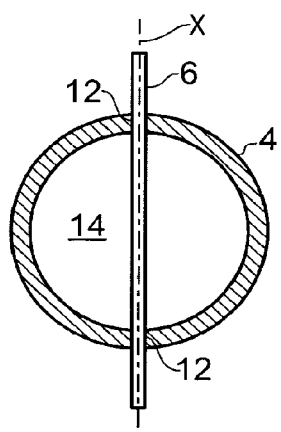
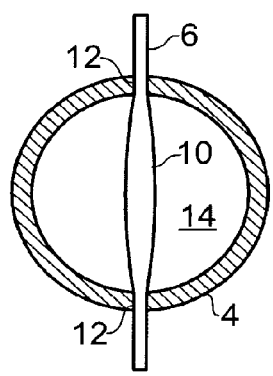
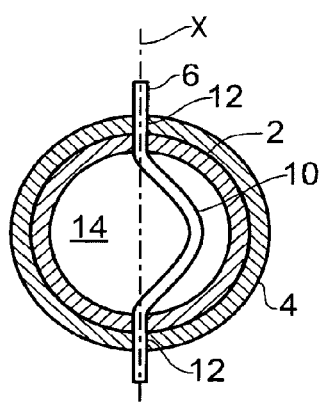
FIG. 10　　　FIG. 11　　　FIG. 12

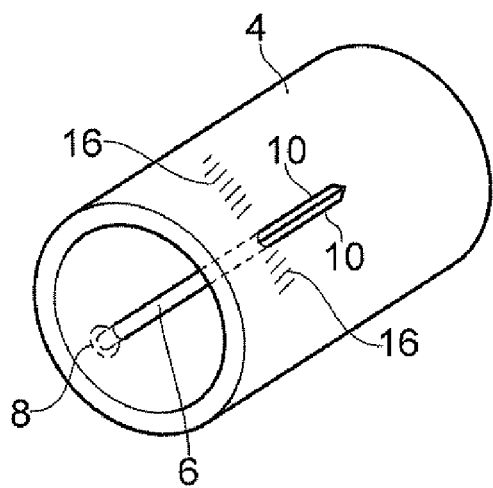
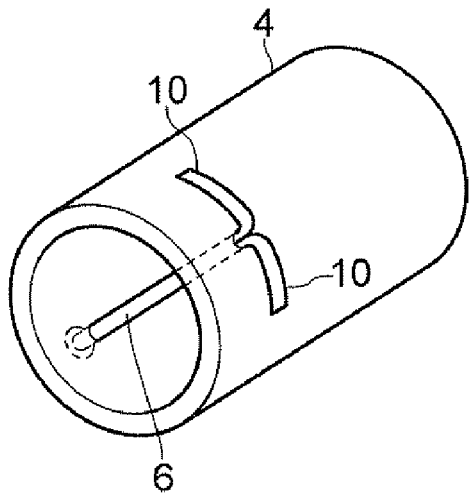
FIG. 13   FIG. 14
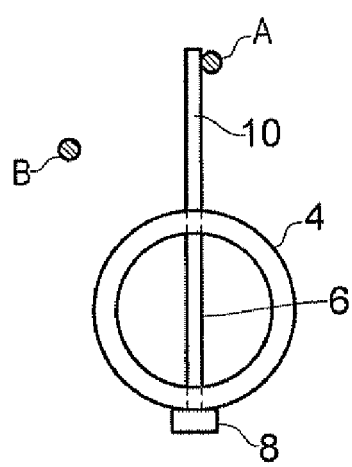
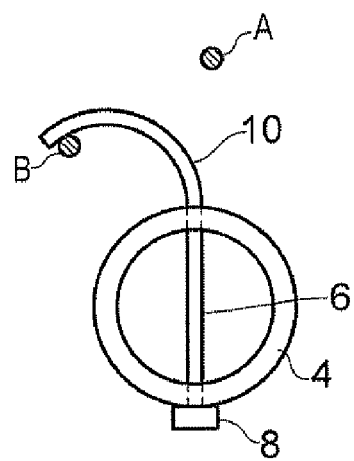
FIG. 15   FIG. 16

ASSEMBLY

BACKGROUND

This invention relates to an assembly comprising first and second components which are retained together by a retaining element.

It is known to use a split pin, or cotter pin, to retain first and second components together, for example to retain a clevis pin against axial displacement within a retaining ring. The cotter pin is inserted through aligned holes in the retaining ring and the clevis pin, and the protruding tangs are bent outwardly from each other to prevent withdrawal of the cotter pin. Typically, the tangs are bent fully round into close engagement with the outer surface of the retaining ring to ensure the best locking function, to minimise fretting, and to leave a neat assembly less prone to snag.

Bending the tangs requires an additional fitting operation after the pin has been inserted. Disassembly is not always easy, and can cause damage to the components.

Shape memory effect materials are known. Components made from such materials exhibit the property of returning to a predetermined "memorised" shape when their temperature changes through a transition temperature. Typically, the component resumes the memorised shape when heated from the "cold" state above the transition temperature to the "hot" state.

A known shape memory effect material is Nitinol, for which the transition temperature may fall in a range extending from below 0° C. to above 150° C. In the "cold" phase, ie below the transition temperature, Nitinol has a martensitic structure, whereas in the "hot" phase above the transition temperature it transforms to an austenitic structure. The memorised shape is fixed by forming the component to the desired shape and then heating it, while maintaining the shape, to an elevated temperature (for example about 500° C.). Subsequently, when the component is reduced in temperature to below its transition temperature, it transforms to the martensitic structure, in which form it has a relatively low Young's modulus and can be deformed under moderate stress. Thus, the component can be formed into a first configuration in the "cold" state. If the component is reheated to the "hot" state, above the transition temperature, it reverts to the austenitic structure and to the previously memorised shape, constituting a second configuration. The transformation results in an increased Young's modulus, so that the second shape is strongly resistant to deformation.

If the component is then cooled again, below the transition temperature, the memorised shape is retained unless the component is subjected to a stress sufficient to deform it. The cycle can be repeated many times, with the component reverting to its memorised shape each time it is heated above the transition temperature, even if it is deformed while in the "cold" state.

Although many materials exhibiting shape memory effect are metallic alloys such as Nitinol, some polymers have also been developed which exhibit the effect. Also, some materials operate in a two-way manner, in that they can have two memorised states, one of which is adopted at temperatures above the transition temperature, and the other of which is adopted at temperatures below the transition temperature. Also, some materials have a single "memorised" state which occurs in the "cold" phase, below the transition temperature, so that the component will resume a predetermined shape at low temperatures after deformation occurring at higher temperatures.

U.S. Pat. No. 5,791,899 discloses the use of a shape memory effect material in a bone anchoring assembly in which a coupling member of shape memory effect material is of a size to be movable within a cavity in a bone anchor while in the "cold" state, but expands or deforms in the memorised state above the transition temperature to become secured firmly within the cavity.

SUMMARY

According to the present invention there is provided an assembly comprising first and second components retained together by a retaining element, the retaining element extending through a hole in the first component and engaging the second component, and having a retaining portion made from a shape memory effect material, wherein the first component defines an internal cavity in which the retaining portion is disposed, the retaining portion having a first configuration in a first phase of the shape memory effect material which enables the retaining portion to pass through the hole, and a second configuration in a second phase of the shape memory effect material in which the retaining portion is prevented from re-entering the hole, thereby to secure the retaining element with respect to the first component.

The retaining element may be in the form of a pin which may have a head at one end to limit travel of the pin into the hole in the insertion direction. The retaining portion may be disposed at the other end of the pin. The pin may extend completely through the first component, so that the head and the retaining portion are situated on opposite sides of the first component. The first component defines an internal cavity, and the retaining portion is disposed within the internal cavity. The pin may extend across the cavity, passing through the hole and a further hole which are at spaced positions in the wall of the cavity.

The pin may have a straight or arcuate longitudinal pin axis when in the first configuration, and the retaining portion of the pin may be deflected from the longitudinal pin axis in the second configuration. Alternatively, or in addition, the retaining portion may expand when transforming from the first configuration to the second configuration to become too large to re-enter the hole.

The retaining portion of the retaining element may move when transforming from the first configuration to the second configuration between respective positions in which indicia on at least one of the components is respectively exposed and, at least partially, concealed. The retaining portion may move when transforming from the first configuration to the second configuration to actuate signalling means. In one embodiment, the retaining element is electrically conductive, for example it may be made from a conductive material, and may move when transforming from the first configuration to the second configuration to vary a conductive path in the signalling means in order to generate a signal when in at least one of the first and second configurations.

The first and second components may be cylindrical, and disposed coaxially one within the other. The second component may have a hole aligned with the hole in the first component so that the first and second components are retained together by the retaining element extending through the holes in both components.

According to another aspect of the present invention, there is provided a method of retaining first and second components together using a retaining element having a retaining portion made from a shape memory effect material, the method comprising passing the retaining element through a hole in the first component and into retaining engagement with the second component while the retaining portion is at a temperature at which the shape memory effect material is in a first phase in which the retaining portion has a first configuration in which it can pass through the hole, changing the temperature of the retaining portion to cause the shape memory effect material to transform into a second phase in which the retaining portion has a second configuration in which the retaining portion is prevented from returning through the hole.

According to another aspect of the present invention, there is provided an assembly comprising first and second components retained together by a retaining element, the retaining element extending through a hole in the first component and engaging the second component, and having a retaining portion made from a shape memory effect material, the retaining portion having a first configuration in a first phase of the shape memory effect material which enables the retaining portion to pass through the hole, and a second configuration in a second phase of the shape memory effect material in which the retaining portion is prevented from re-entering the hole, thereby to secure the retaining element with respect to the first component, wherein the retaining portion of the retaining element moves when transforming from the first configuration to the second configuration, between respective positions in which indicia on at least one of the components is respectively exposed and at least partially concealed.

According to another aspect of the present invention, there is provided an assembly comprising first and second components retained together by a retaining element, the retaining element extending through a hole in the first component and engaging the second component, and having a retaining portion made from a shape memory effect material, the retaining portion having a first configuration in a first phase of the shape memory effect material which enables the retaining portion to pass through the hole, and a second configuration in a second phase of the shape memory effect material in which the retaining portion is prevented from re-entering the hole, thereby to secure the retaining element with respect to the first component, wherein the retaining portion of the retaining element moves when transforming from the first configuration to the second configuration, to actuate signalling means.

BRIEF DESCRIPTION OF THE DRAWINGS

For a better understanding of the present invention, and to show more clearly how it may be carried into effect, reference will now be made, by way of example, to the accompanying drawings, in which:—

FIG. 1 show a clevis pin assembly comprising a retaining pin in a first configuration;

FIG. 2 shows the assembly of FIG. 1 with the retaining pin in a second configuration;

FIGS. 3 to 7 show variants of the assembly of FIGS. 1 and 2;

FIG. 8 shows an alternative form of retaining pin in a first configuration;

FIG. 9 shows the retaining pin of FIG. 8 in a second configuration;

FIG. 10 corresponds to FIG. 8 but shows an alternative retaining pin;

FIGS. 11 and 12 show two alternative second configurations for the retaining pin of FIG. 10;

FIG. 13 shows a further form of retaining pin in a first configuration;

FIG. 14 shows the retaining pin of FIG. 13 in a second configuration;

FIG. 15 shows another clevis pin assembly with the retaining pin in a first configuration; and FIG. 16 corresponds to FIG. 15 but shows the retaining pin in a second configuration.

DETAILED DESCRIPTION OF EMBODIMENTS

FIG. 1 shows a clevis pin 2 supported in a clevis or retaining ring 4. Both the clevis pin 2 and the retaining ring 4 are cylindrical, with the clevis pin 2 fitted coaxially within the retaining ring 4.

Both the clevis pin 2 and the retaining ring 4 have diametrically opposite holes (not shown) which, in the assembled condition shown in FIG. 1, are aligned with each other and receive a retaining element in the form of a pin 6. The retaining pin 6 is a relatively close fit in the holes, and serves to retain the clevis pin 2 and the retaining ring 4 together.

The retaining pin 6 has a head 8 at one end and, in the condition shown in FIG. 1, projects at the other end from the retaining ring 4 as a retaining portion 10.

The entire retaining pin 8 is made from a shape memory effect material such as Nitinol, and the shape memory effect is utilised to enable the retaining pin 6 to be inserted into the holes in the clevis pin 2 and the retaining ring 4 in a first configuration, as shown in FIG. 1, in which the pin 6 has a straight longitudinal pin axis X, and subsequently, on a change in temperature of the retaining pin 6, to adopt a second configuration as shown in FIG. 2, in which the retaining portion 10 is bent with respect to the longitudinal pin axis X so as to lie against the outer cylindrical surface of the retaining ring 4. In the second configuration shown in FIG. 2, the retaining portion 10 acts to prevent withdrawal of the retaining pin 6, since the orientation of the retaining portion 10 prevents it from re-entering the hole in the retaining ring 4.

In order to achieve this effect, the retaining pin 6 is formed into the shape shown in FIG. 2 and is held in that position while the temperature of the pin 6 is raised to an activation temperature of, for example, 450° C. and retained at that temperature for an extended period of, for example, thirty minutes. This allows the material to anneal and de-twin at the stress strain threshold, forming an austenitic crystal structure.

The pin 6 is then cooled to below the transition temperature at which the austenitic crystal structure transforms to a martensitic crystal structure. While the pin is in this "cold" state, it can be deformed into the straight configuration shown in FIG. 1, in which the retaining portion 10 is aligned with the axis X.

To assemble the clevis pin 2 with the retaining ring 4, the clevis pin 2 is placed within the retaining ring 4, and the pin 6, in the straight configuration shown in FIG. 1, is inserted through the aligned holes in the two components. Subsequently, the pin is heated to a temperature above the transition temperature of the material of the pin 6, and this causes the material of the pin 6 to revert to the austenitic crystal structure and to the memorised shape, as shown in FIG. 2. Thus, the retaining portion 10 bends away from the axis X to lie against the outer surface of the retaining ring 4.

Once the pin 6 has assumed the configuration shown in FIG. 2, it will remain in that configuration even if the temperature drops below the transition temperature again, unless the pin 6 is subjected to sufficient stress to bend it away from the deflected position.

The transition temperature of the material of the pin will depend on the composition of the material. For example, the transition temperature may be below normal ambient temperature, for example below 0° C., in which case the pin 6, once formed in the cold condition into the first, straight, configuration shown in FIG. 1, must be maintained below the transition temperature until it has been inserted into the aligned holes in the clevis pin 2 and the retaining ring 4. After insertion, the pin can be allowed to warm up to ambient temperature so that, on passing the transition temperature, it will revert to the second, memorised, configuration shown in FIG. 2.

Alternatively, the transition temperature may be selected to be relatively high, above the expected ambient temperature. The material will then be in the cold condition at ambient temperature, and no special measures are required to keep the pin 6 in the first, straight, configuration shown in FIG. 1. Once the pin is inserted, it must be heated to cause it to assume the second configuration shown in FIG. 2.

Some shape memory effect materials assume their memorised configuration at temperatures below a transition temperature, even when deformed from this configuration in a hot state above the transition temperature. With such materials, the pin must be maintained at an elevated temperature after deformation into the straight configuration shown in FIG. 1 and can then be allowed to cool, or be placed in a refrigerated environment, to cause it to assume the second configuration shown in FIG. 2. Some materials exhibit a two-way shape memory effect, and so will switch between the first and second configurations shown respectively in FIGS. 1 and 2 as the temperature moves above and below the transition temperature. For pins 6 made of such materials, the transition temperature must be selected to lie outside the expected maximum and minimum temperatures experienced by the pin 6 in normal operation.

Heating or cooling of the pin 6 after insertion can be achieved by allowing the pin to return to ambient temperature after it has been deliberately heated or cooled to maintain the straight configuration shown in FIG. 1. Alternatively, external heat (or cooling) may be applied to the pin 6 to cause it to revert to the memorised configuration shown in FIG. 2. In some embodiments, the pin 6 may be heated (or cooled) upon first operation of the machine (such as a gas turbine engine) in which the clevis pin 2 and retaining ring 4 are installed. Thus, the required temperature change can be achieved by heating or cooling by external apparatus, by allowing return to ambient conditions after such external heating or cooling, or by temperature conditions arising during manufacture, assembly, delivery, commissioning, testing or operation of the product in which the assembly is installed. Furthermore, if appropriate materials are used for the pin 6, further temperature changes can be utilised to aid service or disassembly during the lifetime of the product.

The pin 6 in the embodiment of FIGS. 1 and 6 is made, in its entirety, from the shape memory effect alloy. However, it will be appreciated that, in some embodiments, it would be possible for only the retaining portion 10 of the pin 6 to be made of such a material, with the remainder of the pin being made of conventional materials. The two parts of the pin 6 may be mechanically joined, for example by use of a mechanical fixing or mechanical interlock arrangement. Alternatively they may be joined by a suitable adhesive.

In the embodiment of FIGS. 1 and 2, the retaining portion 10 deflects laterally of the longitudinal axis X when transforming to the memorised configuration. However, it will be appreciated that any shape or size change of the retaining portion 10 which prevents the retaining portion 10 from re-entering the hole in the retaining ring 4 will be sufficient to prevent removal of the pin 6. Various possibilities are shown in FIGS. 3 to 7.

FIG. 3 shows a pin 6 which is in the form of a split cotter pin. The retaining portion 10 comprises the ends of the tangs of the pin which deform into a memorised configuration in which they extend in opposite directions over the surface of the retaining ring 4.

FIGS. 4 to 6 show embodiments in which the retaining portion 10 of an unsplit pin 6 can be configured by upsetting, distorting or changing transverse dimension, in order to prevent withdrawal of the pin 6. In FIGS. 4 to 6, only the outer surface of the retaining ring 4 is shown, and in FIG. 8 and subsequent Figures, only the retaining ring 4 is shown. It will be appreciated that a clevis pin 2, or a similar structure having a formation to be retained by the pin 6, will be inserted within the retaining ring 4.

FIGS. 8 and 9 show an embodiment in which the pin lacks the head 8 of the embodiments of FIGS. 1 to 7, but extends through holes 12 which are disposed on opposite sides of the hollow interior 14 of the retaining ring 4. In the embodiment of FIGS. 8 and 9, the holes are not disposed diametrically opposite each other, and so, in its first configuration, the pin 6 is of arcuate form, having an arcuate longitudinal pin axis X. The retaining portion 10 is situated within the cavity 14 and, in the second configuration shown in FIG. 9, is deflected away from the longitudinal axis X. The pin 6 consequently no longer has a continuous curvature, and is therefore locked with respect to the ring 4 by the retaining portion 10.

FIGS. 10 to 12 show embodiments which start from the same first configuration shown in FIG. 10, in which the pin 6 has a straight longitudinal pin axis X, and extends diametrically across the interior of the retaining ring 4. In the embodiment of FIG. 11, the retaining portion 10 of the pin 6 expands at temperatures above the transition temperature, so that the retaining portion 10 cannot re-enter the holes 12, so locking the pin 6 with respect to the retaining ring 4. In the embodiment of FIG. 12, the retaining portion 10 is deflected away from the axis X, so, again, preventing re-entry of the retaining portion 10 into the holes 12, so that the pin 6 is locked with respect to the retaining ring 4.

FIGS. 13 and 14 show an embodiment similar to that of FIG. 3, in which the pin 6 is in the form of a split cotter pin, the tangs 10 of which constitute the retaining portion. As shown schematically in FIG. 13, the surface of the retaining ring 4 is provided with indicia such as coloured markings 16. These indicia are exposed when the pin 6 is in the first condition, ie with the tangs 10 aligned with the pin axis X. However, when the tangs 10 are in the second configuration shown in FIG. 14, the indicia 16 are covered, at least partially, by the tangs 10. The markings 16 can thus be used as a visual indication of the condition of the pin 6 so that, for example, if the markings 16 are visible, this provides an indication that the pin 6 has not assumed the second configuration, and that the assembly is insecure.

The displacement of the retaining portion 10 of the pin 6 may be employed in different ways to signify satisfactory locking of the pin 6, or other appropriate parameters. For example, the retaining portion 10 can be arranged so as to actuate a mechanical or opto-electronic switch or, as indicated in FIGS. 15 and 16, to make or break an electrical switch. Thus, in the cold condition shown in FIG. 15, the straight pin 6 in the first configuration engages a switch contact A, whereas in the second configuration shown in FIG. 16, the retaining portion 10 engages a switch contact B. The contacts A and B may represent micro switches, so that engagement of them by the retaining portion 10 causes an appropriate signal to be delivered, such as a signal indicating whether or not the retaining pin 6 is in the locked configuration. Alternatively, the pin 6 itself may be made of an electrically conductive material and constitute part of an electrical circuit, so that current flows through the pin 6 to the contact A or contact B respectively to deliver an appropriate signal.

By appropriate selection of the material of the pin 6 in any of the above embodiments, it is possible to achieve a fail-safe locking of the pin 6, in which the change in configuration of the pin from the first configuration which allows easy insertion, to the second configuration, which prevents withdrawal is achieved upon a change in temperature which occurs in the normal course of events during installation of the pin 6 or subsequent operations.

It will be appreciated that the retaining element has been described with reference to the drawings in terms of the pin 6, although other configurations of retaining element are possible, such as plate elements. Also, although the invention has been described with reference to a clevis pin 2 and a retaining ring 4, it will be appreciated that the invention may be applied to other components, which need not be cylindrical.

The invention may be used to retain components together in a wide variety of applications, for example, to retain inlet guide vanes in a gas turbine engine, to link together components of control system mechanisms and ground support equipment, and in other safety critical applications in process plant, air frame sub-systems, naval systems, etc.

The invention claimed is:

1. An assembly comprising:
a first component having a wall defining a first hole;
a second component; and
a retaining element, extending through the first hole in the first component and engaging the second component, wherein the first component and the second component are retained together by the retaining element,
the retaining element having portion made from a shape memory effect material, wherein
the wall of the first component encloses an internal cavity in which the retaining portion is disposed,
the wall of the first component defines a second hole opposite the first hole across the internal cavity,
the retaining portion has a first configuration in a first phase of the shape memory effect material which enables the retaining portion to pass through the first hole,
the retaining portion has a second configuration in a second phase of the shape memory effect material in which the retaining portion is prevented from re-entering the first hole, thereby securing the retaining element with respect to the first component,
the retaining element is in the form of a pin which extends through the first hole in the first component into the internal cavity, and through the second hole in the first component to emerge from the internal cavity,
the first and second holes in the first component being at spaced positions in the wall of the first component,
the retaining portion having a straight or arcuate longitudinal pin axis when in the first configuration, and
the retaining portion being deflected from the pin axis in the internal cavity between the first and second holes in the second configuration.

2. The assembly as claimed in claim 1, in which the pin has a head at one end to limit insertion of the pin into the first hole.

3. The assembly as claimed in claim 2, in which the retaining portion is disposed at another end of the pin.

4. The assembly as claimed in claim 1, in which the retaining portion is enlarged in the second configuration to prevent re-entry of the retaining portion into the first hole.

5. The assembly as claimed in claim 1, in which the retaining portion of the retaining element moves when transforming from the first configuration to the second configuration, between respective positions in which indicia on at least one of the components is respectively exposed and at least partially concealed.

6. The assembly as claimed in claim 1, in which the retaining portion of the retaining element moves when transforming from the first configuration to the second configuration, to actuate signaling means.

7. The assembly as claimed in claim 6, in which the retaining element is electrically conductive, and moves when transforming to vary a conductive path in the signaling means.

8. The assembly as claimed in claim 1, in which the first and second components are cylindrical and disposed coaxially one within the other.

9. The assembly as claimed in claim 1, in which the second component defines third and fourth holes aligned with the first and second holes in the first component, respectively, the retaining element extending through both the third and fourth holes.

10. A method of retaining first and second components together using a retaining element having a retaining portion made from a shape memory effect material, the first component having a wall defining a first hole and enclosing an internal cavity in which the retaining portion is disposed, the method comprising:
passing the retaining element through the first hole in the first component and into retaining engagement with the second component while the retaining portion is at a temperature at which the shape memory effect material is in a first phase in which the retaining portion has a first configuration in which it can pass through the first hole,
changing the temperature of the retaining portion to cause the shape memory effect material to transform into a second phase,
wherein the retaining element has a second configuration that prevents the retaining portion from returning through the first hole, thereby securing the retaining element with respect to the first component,
the wall of the first component defines a second hole opposite the first hole across the internal cavity,
the retaining element is in the form of a pin which extends through the first hole in the first component into the internal cavity, and through the second hole in the first component to emerge from the cavity,
the first and second holes in the first component being at spaced positions in the wall of the cavity,
the retaining portion having a straight or arcuate longitudinal pin axis when in the first configuration, and
the retaining portion being deflected from the pin axis in the internal cavity between the first and second holes in the second configuration.

11. An assembly comprising:
a first component having a wall defining a first hole;
a second component; and
a retaining element, extending through the first hole in the first component and engaging the second component, wherein the first component and the second component are retained together by a retaining element,
the retaining element having a retaining portion made from a shape memory effect material, wherein
the wall of the first component encloses an internal cavity in which the retaining portion is disposed,
the wall of the first component defines a second hole opposite the first hole across the internal cavity,
the retaining portion has a first configuration in a first phase of the shape memory effect material which enables the retaining portion to pass through the first hole, the retaining portion has a second configuration in a second phase of the shape memory effect material in which the retaining portion is prevented from re-entering the first hole, thereby securing the retaining element with respect to the first component, the retaining element is in the form of a pin which extends through the first hole in the first component into the internal cavity, and through the second hole in the first component to emerge from the cavity, the first and second holes in the first component being at spaced positions in the wall of the cavity, the retaining portion having a straight or arcuate longitudinal pin axis when in the first configuration, the retaining portion being deflected from the pin axis in the internal cavity between the first and second holes in the second configuration, and the retaining portion of the retaining element moves when transforming from the first configuration to the second configuration, between respective positions in which indicia on at least one of the components is respectively exposed and at least partially concealed.

12. An assembly comprising:

a first component having a wall defining a first hole;

a second component; and a retaining element, extending through the first hole in the first component and engaging the second component, wherein the first component and the second component are retained together by the retaining element, the retaining element having a retaining portion made from a shape memory effect material, wherein the wall of the first component encloses an internal cavity in which the retaining portion is disposed, the wall of the first component defines a second hole opposite the first hole across the internal cavity, the retaining portion has a first configuration in a first phase of the shape memory effect material which enables the retaining portion to pass through the first hole, the retaining portion has a second configuration in a second phase of the shape memory effect material in which the retaining portion is prevented from re-entering the first hole, thereby securing the retaining element with respect to the first component, the retaining element is in the form of a pin which extends through the first hole in the first component into the internal cavity, and through the second hole in the first component to emerge from the cavity, the first and second holes in the first component being at spaced positions in the wall of the cavity, the retaining portion having a straight or arcuate longitudinal pin axis when in the first configuration, the retaining portion being deflected from the pin axis in the internal cavity between the first and second holes in the second configuration, and the retaining portion of the retaining element moves when transforming from the first configuration to the second configuration, to actuate signaling means.

13. The assembly as claimed in claim 12, in which the retaining element is electrically conductive, and moves when transforming to vary a conductive path in the signaling means.

14. The assembly as claimed in claim 1, wherein the retaining portion is not in contact with the wall of the first component when it is deflected from the pin axis in the internal cavity in the second configuration.

\* \* \* \* \*